United States Patent [19]

Pappalardo et al.

[11] Patent Number: 5,524,016
[45] Date of Patent: Jun. 4, 1996

[54] OPTICAL EMITTER FOR AMPLIFICATION AND PROCESS FOR MAKING SAME

[75] Inventors: Romano G. Pappalardo, Sudbury; Thomas E. Peters, Chelmsford; Karen Lee, Salem; William J. Miniscalco, Sudbury, all of Mass.

[73] Assignee: GTE Laboratories Incorporated, Waltham, Mass.

[21] Appl. No.: 257,751

[22] Filed: Jun. 9, 1994

[51] Int. Cl.$^6$ .................................................. H01S 3/17
[52] U.S. Cl. .................. 372/40; 372/70; 372/39; 252/301.4 F
[58] Field of Search .................. 372/39–41; 252/301.4 F

[56] References Cited

U.S. PATENT DOCUMENTS

| | | | |
|---|---|---|---|
| 4,932,031 | 6/1990 | Alfano et al. | 372/41 |
| 4,949,347 | 9/1990 | Satoh et al. | 372/41 |
| 5,311,532 | 5/1994 | Belt et al. | 372/41 |

*Primary Examiner*—Leon Scott, Jr.
*Attorney, Agent, or Firm*—Lawrence E. Monks

[57] ABSTRACT

A host acting as an optical emitter and a process of making the same for the ~1.3 μm to ~1.55 μm spectral region utilized in optical communications is disclosed. The host is Cr-activated willemite ($Zn_2SiO_4$). Efficient band-emission at room temperature, with peak at 1.42 μm, is observed on exiting the material in the near infrared, typically at 730 nm and 829 nm.

7 Claims, 9 Drawing Sheets

OPTICAL EMITTER FOR AMPLIFICATION AND PROCESS FOR MAKING SAME

FIELD OF THE INVENTION

The current invention relates generally to hosts for optically pumped lasers and optical amplifiers, and more particularly to hosts doped with chromium for lasers and optical amplifiers that operate in the infrared.

BACKGROUND OF THE INVENTION

There is a continuing need for tunable lasers and broadband optical amplifiers that operate in the near to mid infrared range for a variety of applications. These applications include optical fiber and free space communications, range finders, spectroscopy, chemical analysis, and LIDAR (Light Detection And Ranging). The spectral range of interest extends roughly from 1000 to 2000 nm, and devices in both bulk and waveguide formats are needed. While crystalline hosts doped with rare earth ions can be used to make optically pumped lasers with high power and efficiency, they are not tunable and do not satisfy the requirements for a wide gain-bandwidth. Rare earth ions in glass hosts have demonstrated excellent performance as optically pumped fiber lasers and amplifiers, with $Er^{3+}$ at approximately 1540 nm being particularly successful. While their emission and absorption spectra are significantly broader than those of rare earth doped crystalline hosts, they are still narrow enough to severely restrict their spectral coverage. In addition, rare earth doped crystals and glasses provide optical gain at specific wavelengths that cannot be modified even if the host material is changed. For example, $Er^{3+}$ doped glasses only provide useful gain from approximately 1520 nm to 1560 nm. Because almost all terrestrial optical fiber systems operate in the region of 1300 nm, it would be particularly useful to find dopant/host combinations that provide gain in a broad band centered at 1300 nm with efficiencies comparable to those of $Er^{3+}$ doped glasses.

The two rare earth candidates for this role suffer from serious fundamental shortcomings. The $Nd^{3+}$ emission spectrum is at a slightly longer wavelength than desired and suffers from severe excited state absorption on its short wavelength side. Significant gain has been obtained only for wavelengths greater than 1320 nm. Although $Pr^{3+}$ provides gain at the desired wavelengths, the upper level of the gain transition is severely quenched by nonradiative relaxation even in fluorozirconate hosts, the best practical glass hosts available. This leads to high thresholds for lasers and large pump power requirements for amplifiers even when single-mode fibers are used.

Several transition-metal-doped crystals have been operated as optically pumped bulk lasers in the spectral range of interest. Examples include $V^{2+}$, $Ni^{2+}$, and $Co^{2+}$ in a variety of hosts. More recently, laser action has been reported for $Cr^{4+}$ in forsterite and YAG. Transition metal ions are generally characterized by extremely broad, vibronically assisted, optical transitions that can provide gain over an extended wavelength range. To date, however, only $Co^{2+}$:$MgF_2$ has performed well enough to be available as a commercial laser in the spectral region beyond 1100 nm. There are no known reports of optical amplifiers in the 1300 nm spectral region based upon transition metal ions. Glasses are not practical as hosts for transition metal ions since they lead to a high nonradiative relaxation rate and thus a low quantum efficiency.

It is thus desirable to find materials that exhibit luminescence in the 1300 nm spectral region so as to be usable as optical amplifiers for fiber optic telecommunications applications. More generally, it is desireous to find a family of transition metal doped materials providing gain for use as lasers and optical amplifiers throughout the 1000 to 2000 nm range.

OBJECTS OF THE INVENTION

Accordingly, it is a primary object of this invention to obviate the above noted and other disadvantages of the prior art.

It is a further object of the invention to provide a means for obtaining optical gain in the wavelength region of approximately 1300 nm.

It is a yet further object of the invention to provide optical emission in the wavelength region of approximately 1300 nm using chromium doped materials.

It is a further object of the invention to provide a process for producing a chromium doped material giving optical emission in the wavelength region of approximately 1300 nm It is a further object of the invention to provide processing parameters for increasing the performance of a chromium doped material giving optical emission in the wavelength region of approximately 1300 nm.

It is a still further object of the invention to provide for waveguide lasers and optical amplifiers having optical emission in the wavelength region of approximately 1300 nm using chromium doped materials.

It is a still further object of the invention to provide for bulk lasers and optical amplifiers having optical emission in the wavelength region of approximately 1300 nm using chromium doped materials.

SUMMARY OF THE INVENTION

In one aspect of the invention, a family of chromium doped host materials are utilized to generate stimulated emission in the near to mid infrared spectrum. These chromium doped materials are advantageously utilized in waveguide, and bulk lasers and in optical amplifier systems. When optically pumped, emission occurs at wavelengths in the region of 1300 nm.

In a further aspect of the invention, a process for producing a chromium doped material which can act as a host material to generate stimulated emission in the near to mid infrared spectrum when pumped is described.

DETAILED DESCRIPTION OF THE INVENTION

There is a current interest in optical-communication technology in developing novel infrared-emitting materials that may serve as optical amplifiers in the spectral regions utilized in optical-fiber communications. The luminescent materials should be adequately excited by existing, compact solid-state sources, such as laser diodes, and should be capable of emission (and optical gain) in the spectral region from ⁻1.3µ to ⁻1.55µ.

Figure 1:
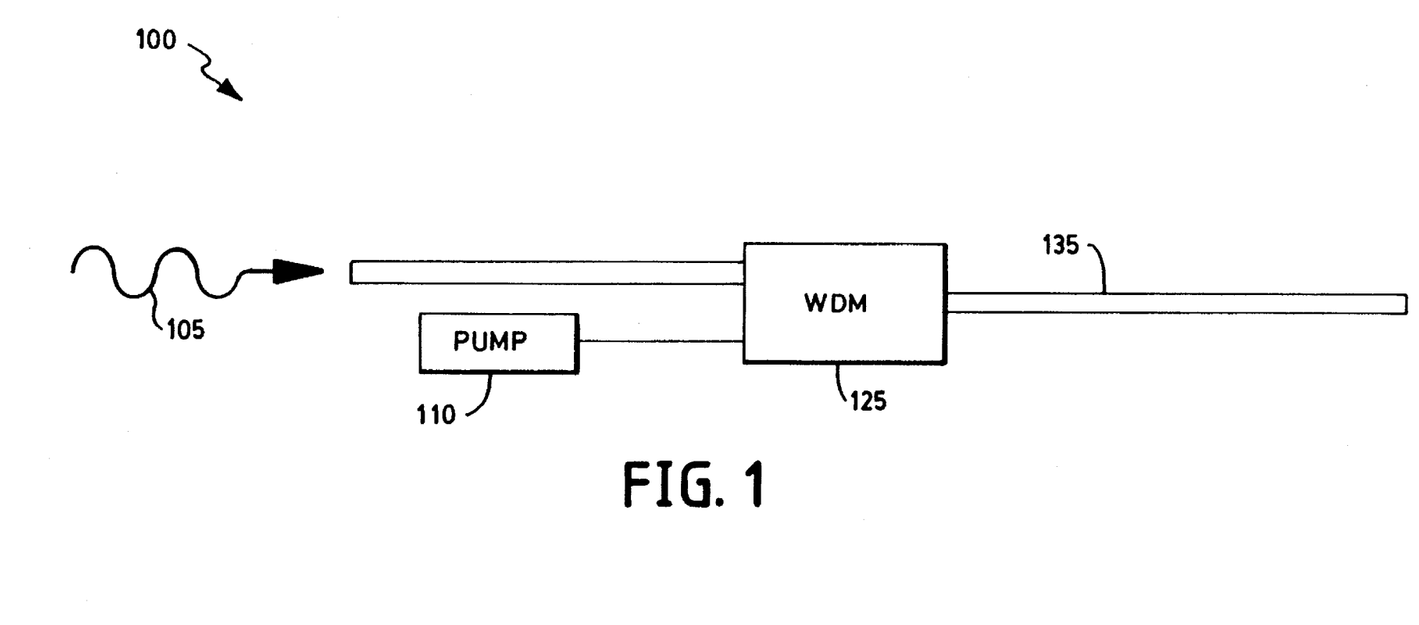
FIG. 1 is a schematic of an fiber amplifier in accordance with one embodiment of the invention.

FIG. 1 depicts an illustration of a doped fiber amplifier 100 in accordance with the present invention. In the preferred embodiment of the instant invention, the fiber is doped with a chromium material as described herein. An input signal is presented at 105. Pump radiation from a pump laser module 110 is combined with the input signal at 105 in a wavelength division multiplexer 125 producing a combined output into a doped fiber 135. Pump laser module 110 is a pigtailed laser diode which generates light radiation at wavelength $\lambda_1$. The output of fiber 135 is an amplified signal of signal 105, due to stimulated emmision occurring within the doped fiber 135.

The preparation of a IR-emitting material for fiber 135, namely Chromium-activated zinc orthosilicate ($Zn_2SiO_4$:Cr), meets the aforementioned excitation and emission properties.

The Cr-activated materials were synthesized by solid-state reaction. Typical reactants for one such preparation are given in the table below.

TABLE 1

| Reactant | Gram Quantity |
|---|---|
| $H_4SiO_4$ | 5.0 |
| ZnO | 11.0 |
| $NH_4F$ | 0.02 |
| $NH_4Cl$ | 0.16 |
| $CrCl_2$ (aq.) | (0.02–0.1 mole %) |

A Cr-containing solution was slurried into a mechanical mixture of the dry reagents, wherein the ammonium halides were present to enhance reactivity. By analogy to standard preparative techniques for the well-known $Zn_2SiO_4$:Mn phosphor, a slight $SiO_2$ excess was used in the formulation. The dried slurry of the reactants was fired in covered silica crucibles at 1250° C. for four hours, using a fast ramp-up of the temperature. The firing atmosphere was either inert (nitrogen) or oxidizing (air or oxygen), as indicated in the summary listing of the table below.

TABLE 2

| Batch | Cation percent Cr | Firing Atmosphere |
|---|---|---|
| KL5 | 0.1 | air |
| KL6 | 0.05 | air |
| KL7 | 0.01 | nitrogen |
| KL8 | 0.05 | nitrogen |
| KL9 | 0.02 | air |
| KL10 | 0.02 | nitrogen |
| KL11 | 0.1 | oxygen |
| KL12 | 0.05 | oxygen |
| KL13 | 0.02 | oxygen |
| W7398-29-1A* | 0.02 | air |
| W7398-29-2A** | 0.02 | air |

*Slight silica excess (5% over stoichiometry)
**Stoichiometric silica formulation X-ray diffraction patterns of sample KL5 to KL10 in the above table were all similar and corresponded to single-phase $Zn_2SiO_4$. No additional phases were detected in any of the patterns.

Two preparations, the last two entries in the table, were carried out in the absence of halide flux. A higher emission intensity was observed for the formulation that was stoichiometric in silica that being the last entry of the table.

Although the samples were prepared by a solid state process one of ordinary skill in the art will recognize that these samples may also be prepared by a melting process sucg as for example a Bridgeman or Czochralski process.

The emission and excitation spectra were obtained using a modified, modular spectrofluorimeter, provided with a 450 Watt Hg-Xe arc.

The sample emission, after being spectrally dispersed in the emission double-monochromator, was routed to a liquid-nitrogen-cooled Ge detector. The signal from the latter was sent to a lock-in amplifier.

Suitable glass filters were used at the input/output slits of the excitation and emission monochromators, so as to eliminate unwanted spectral orders in the excitation and emission beams.

In the measurements at low temperatures, ethanol slurries of the powders were packed underneath a quartz window, and thinly spread over the gold-plated "cold finger" of a close-circuit liquid-helium refrigerant, provided with a temperature controller.

Figure 2:
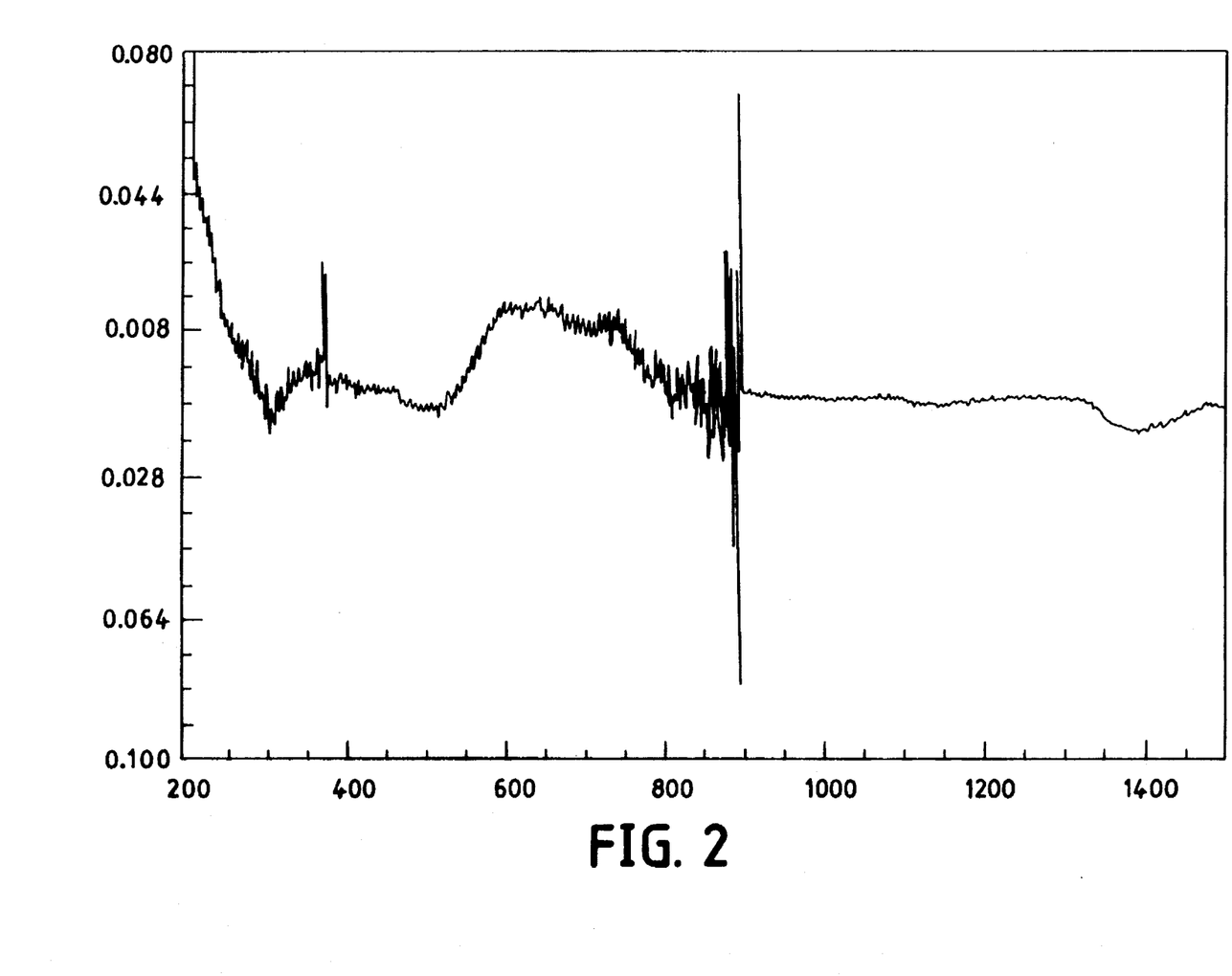
FIG. 2 shows the absorption spectrum of $Zn_2SiO_4$:02 c/o Cr as derived from the corresponding reflectance spectrum of the powder.

The absorption spectrum of $Zn_2SiO_4$:02 c/o Cr as derived from the corresponding reflectance spectrum of the powder is shown in FIG. 2. Two absorption bands are noticeable, one peaking at ⁻400 nm, and a broader absorption from ⁻550 nm to ⁻850 nm.

Figure 3:
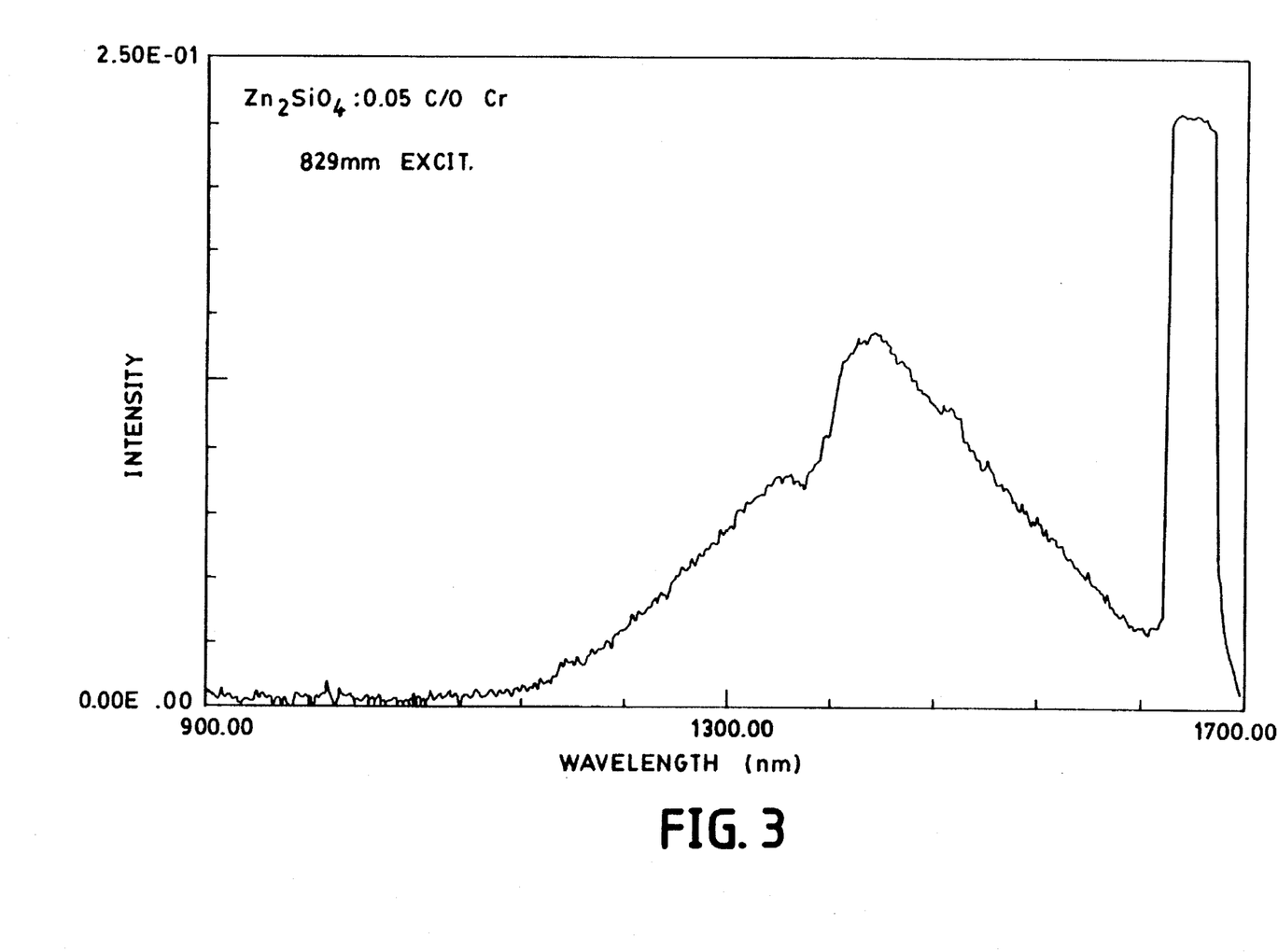
FIG. 3 shows the room-temperature emission spectrum of $Zn_2SiO_4$:Cr for batch KL6 with 0.05% cation percent Cr.

The room-temperature emission spectrum of $Zn_2SiO_4$:Cr (with 0.05% cation percent Cr; batch KL6 from Table 2) is shown in FIG. 3. The excitation wavelength was chosen as 829 nm for two reasons: 1) the source employed (the Hg-Xe arc) exhibits an intense emission line at this wavelength; 2) commercially-available laser diodes, ultimately to be used to pump the optical amplifiers, usually emit in the 810 nm–830 nm range.

With reference to FIG. 3, the emission band resulting from excitation, at 829 nm starts at ⁻1.12 µm, peaks at ⁻1.41 µnm and extends to ⁻1.7 µm, where it merges with the signal due to the excitation wavelength detected in second order. The emission dip at ⁻1.33 µm is due to absorption by atmospheric water-vapor.

Figure 4:
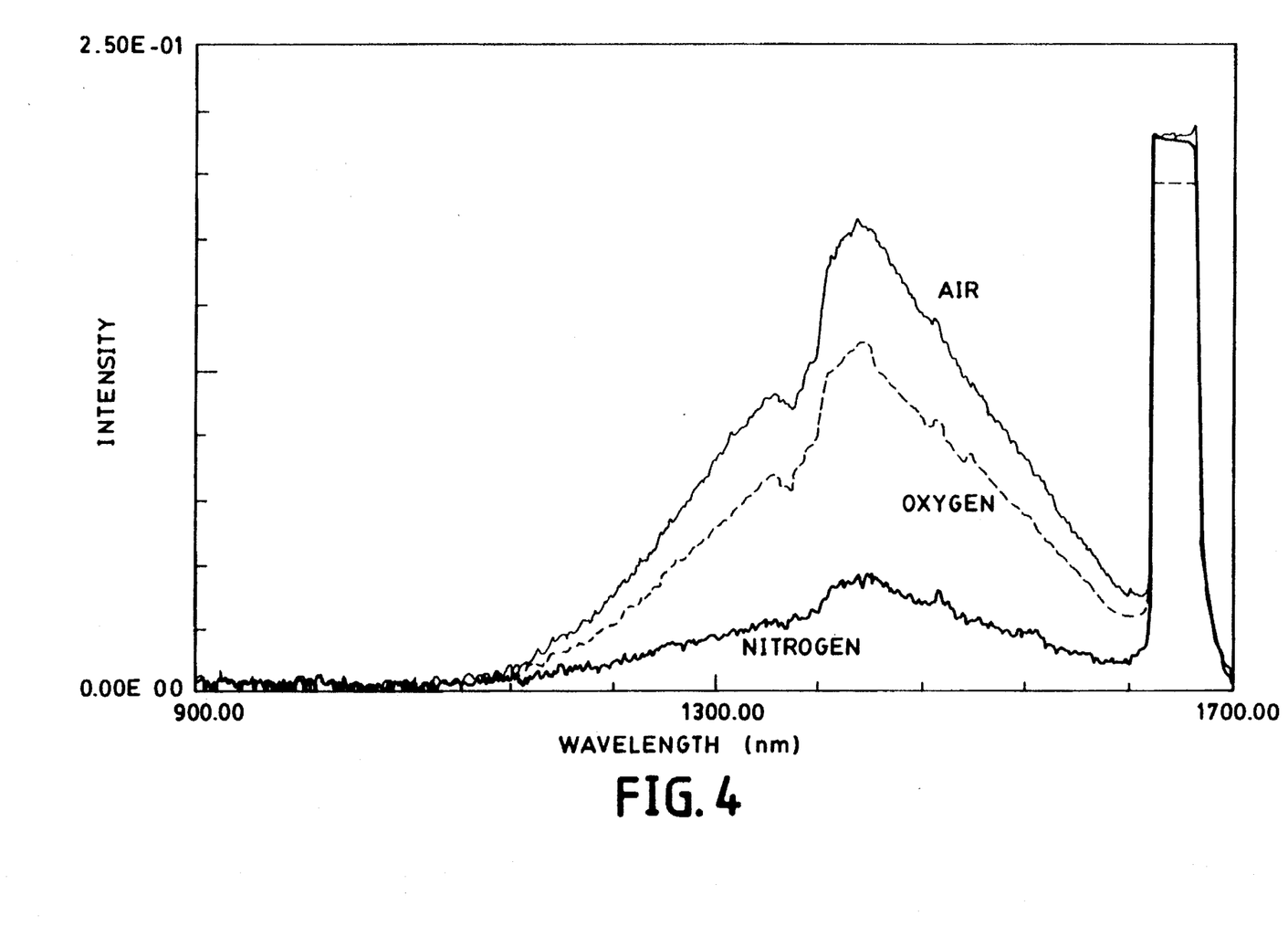
FIG. 4 shows the shape of the emission band versus the firing atmosphere, whether neutral or oxidizing.

The firing atmosphere, neutral or oxidizing (see Table 2), does not markedly affect the shape of the emission band, but determines its intensity. FIG. 4 shows this for the case of samples with nominal concentration of 0.02 c/o (cation percent) Cr. The relatively-low emission intensity for the material fired in nitrogen atmosphere is enhanced by firing in oxygen, or, even better, in air.

Figure 5:
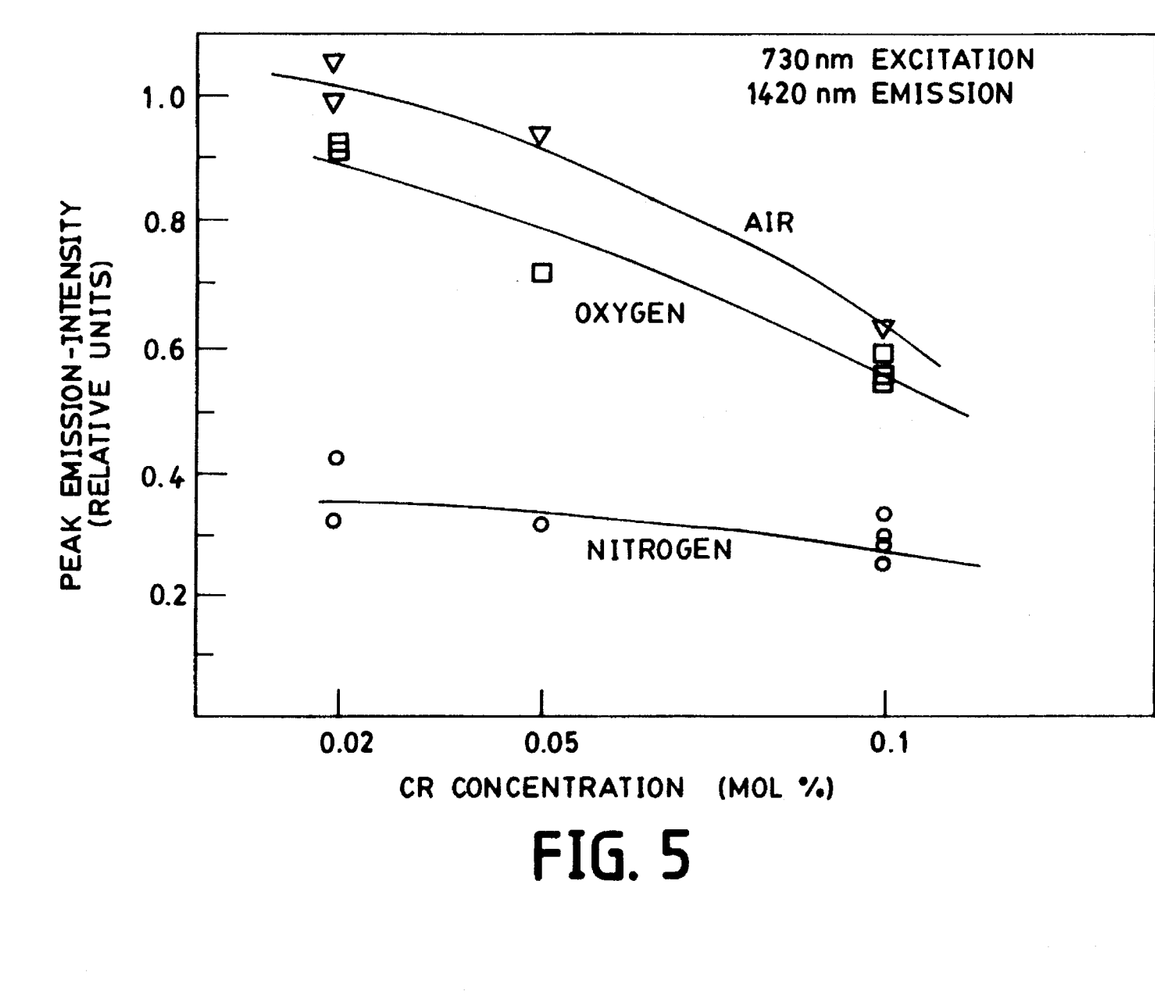
FIG. 5 shows an overall view of the emission-band peak-intensity as a function of Cr concentration and firing atmosphere.

An overall view of the emission-band peak-intensity as a function of Cr concentration and firing atmosphere is given in FIG. 5, for the case of room-temperature excitation at 730 nm. On firing in nitrogen atmosphere, the peak emission-intensity is relatively low, and fairly insensitive to the formulated Cr content. Firing in oxidizing atmosphere improves the emission intensity, and the highest value for the tatter is observed at a nominal concentration of 0.02 c/o. Similar trends in peak emission-intensity were also observed for excitation at 829 nm and 996 nm.

A powder sample from batch W7398-29-2A ($Zn_2SiO_4$:0.02 c/o Cr; air-fired; no halide flux) was also spectrally characterized at low temperatures. For excitation at 829 nm, the emission intensity increased by a factor of ~2.5 in going from room temperature to 78K.

A nitrogen-laser-pumped dye-laser was set for emission at 730 nm. The dye-laser beam was directed onto the $Zn_2SiO_4$:Cr powders, and the resulting emission was dispersed with a prism monochromator. Detection was performed using a fast-response, liquid-nitrogen-cooled Ge detector.

Figure 6:
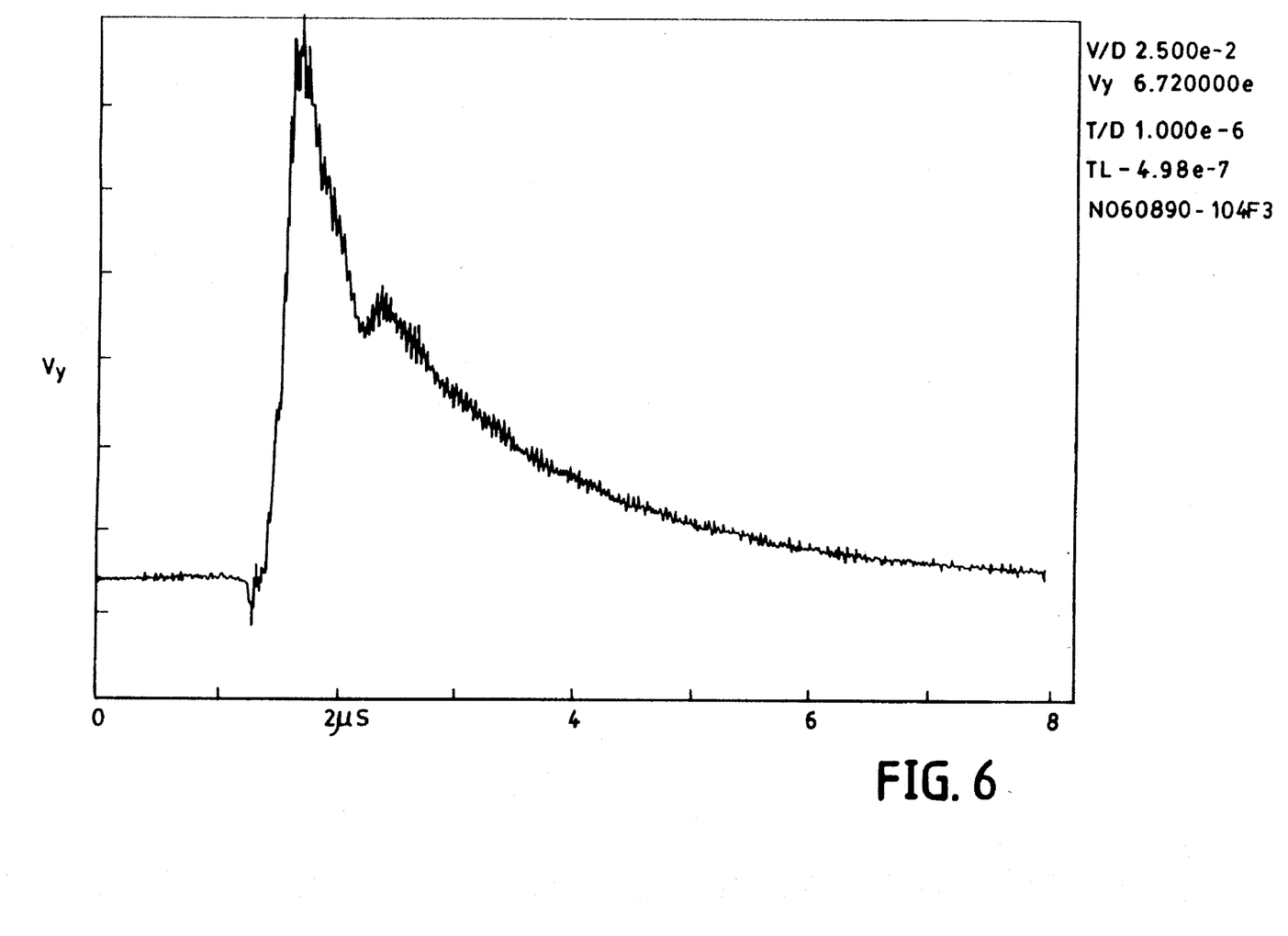
FIG. 6 and FIG. 7 depict emission decay for different batches of the chromium doped material.

An example of an emission-decay pulse is shown in FIG. 6 for batch KL13 ($Zn_2SiO_4$:0.02 c/o Cr; oxygen fired). The room-temperature emission was monitored at 1.58 μm. In the figure the narrow downward transient at ~1.2 μs corresponds to the firing of the nitrogen laser. This is followed by the rising portion of the emission signal: ~200 ns separates the 10% and 90% points on the latter. This risetime is caused in part by the response time of the detector circuitry; instrumental effects are also responsible for the dip observed in the falling portion of the signal, at ~0.85 μs after the signal inception.

Figure 7:
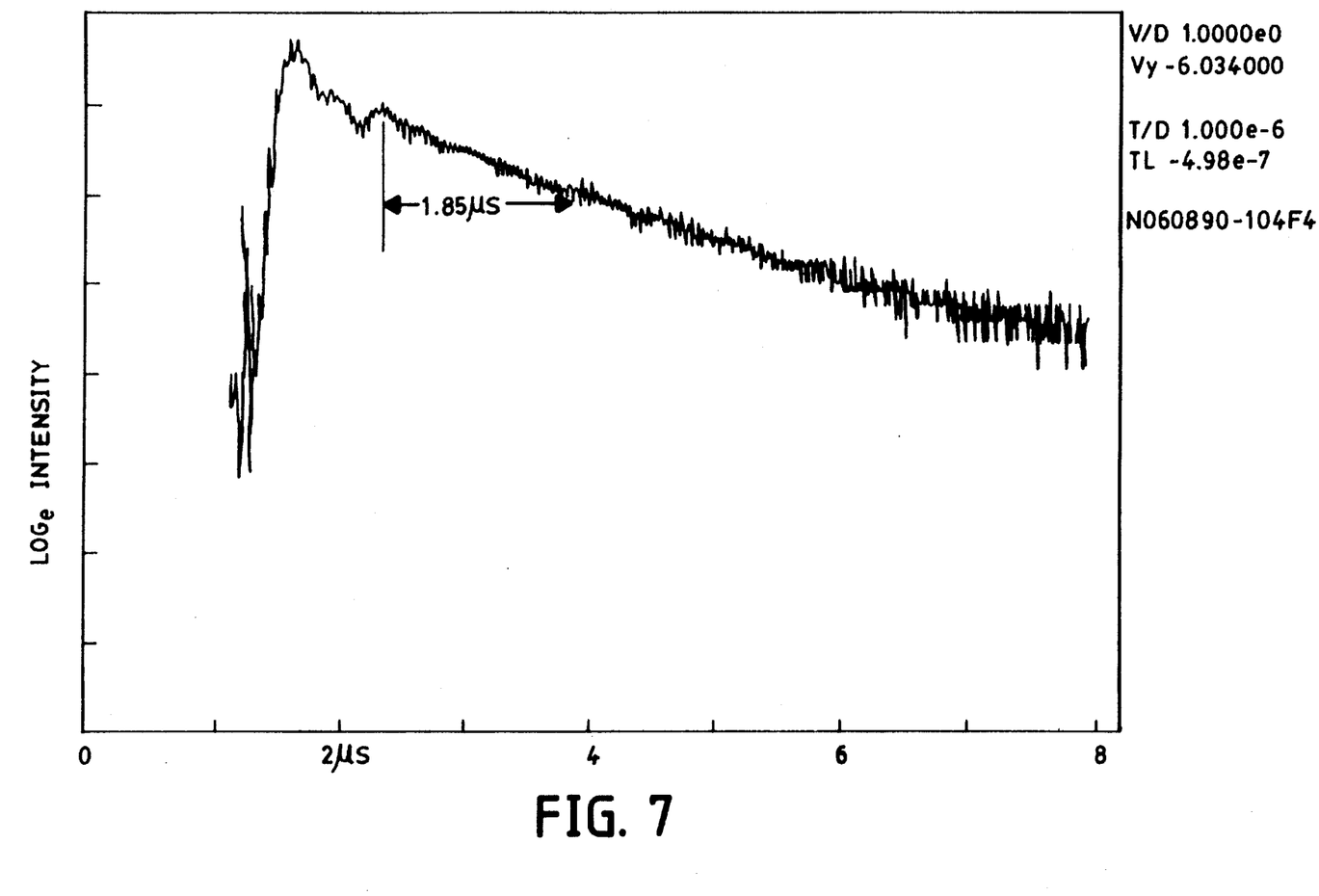

A similar emission pulse for a sample from batch KL10 is presented in FIG. 7 as a semi-log plot, with the natural logarithm of the intensity plotted against time. As indicated in the figure, the emission decay after the detector transient-dip is reasonably exponential, with a decay constant of ~1.85 μs. The emission sampled at 1.45μ. This type of data processing was repeated for most of the available samples, while monitoring the emission at the emission-peak wavelength, or at other wavelengths on the emission-band envelope. A reasonable exponential decay was observed in all cases, irrespective of concentration and firing atmosphere, with the emission decay-constants (time to 1/e) varying over a rather narrow range, from ~1.75 μs to ~1.9 μs.

Figure 8:
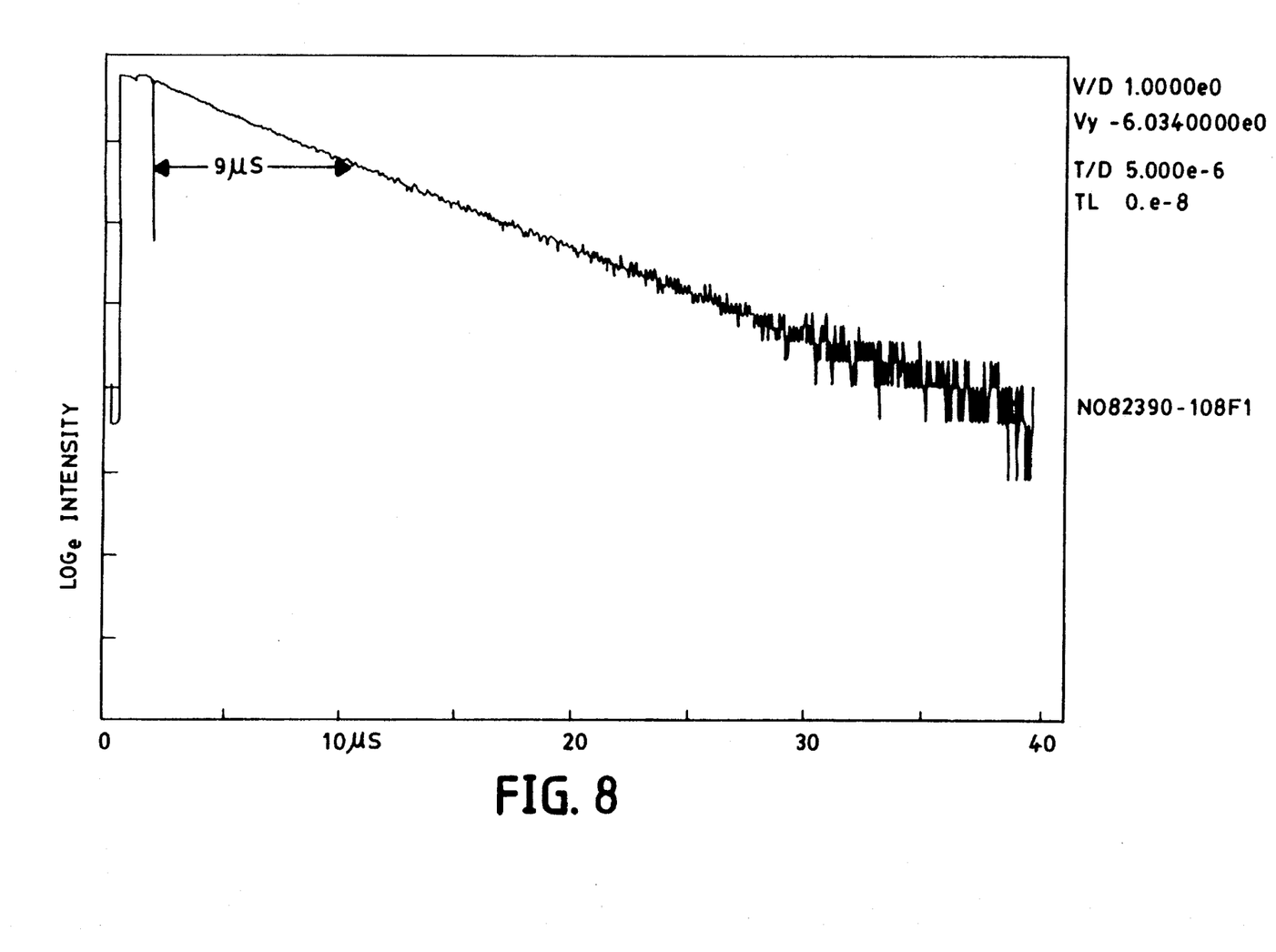
FIG. 8 and FIG. 9 depict temperature dependence of the emission decay times.

A lengthening of the emission decay was observed on lowering the sample temperature. An example is given in FIG. 8, wherein an exponential decay with a time constant of 9 μs is observed at 78K for sample KL13 (0.02%Cr, oxygen fired). Excitation was by means of Rhodamine B lasing at 585 nm, and the emission was monitored at 1.48 μm.

In the same sample, the change in the value of the emission-decay constant was followed from room temperature to 13K, for excitation at 652 nm. The resulting decay constants are listed in Table 3 below and are also plotted in FIG. 9 as a function of the reciprocal temperature.

TABLE 3

| Temperature in K | Decay constant in μs |
|---|---|
| 290 | 1.9 |
| 150 | 5.5 |
| 80 | 9.0 |
| 40 | 11.0 |
| 13 | 11.0 |

Figure 9:
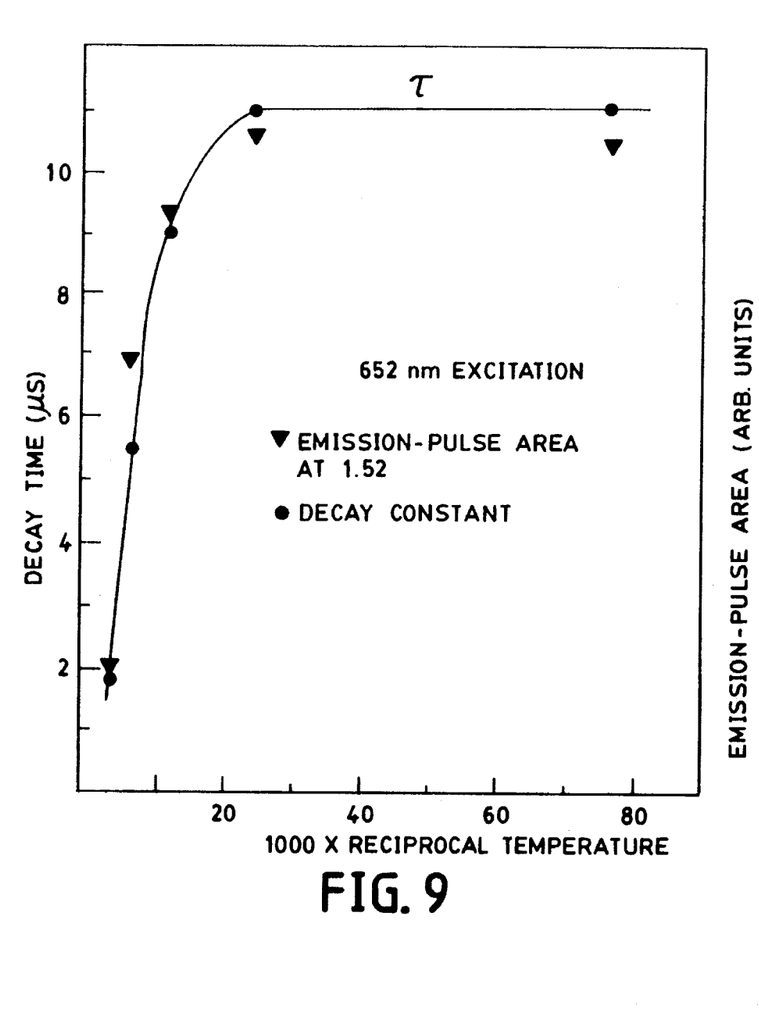

A fivefold increase in the decay constant is observed from room temperature to ~40K. No additional lengthening of the emission was noted on further cooling the sample to ~13K.

In the same figure we also plot in relative units the areas of the emission pulses, as monitored at 1.52 μm. elements) optical transitions.

On the basis of the above described measurements it is seen that chromium activated zinc orthosilicate when prepared as indicated provides emission in the 1300 nm range which is the region of interest. Further, it is seen that the material when prepared as described has absorption bands suitable for optical pumping by a diode laser or diode-pumped solid state laser.

Processing the chromium activated zinc orthosilicate in an oxidizing atmosphere enhances emission intensity and improves the efficiency of the amplifiers or lasers produced from the material. Concentration quenching reduces emission intensity with increasing Cr concentrations. Thus concentrations below 0.1 mole percent are preferred. Thermal quenching is present for the chromium activated zinc orthosilicate material, therefor device efficiency will improve with cooling.

The measurements were not sufficient to unambiguously determine the oxidation state of the Cr ion. Emission band positioning suggests $Cr^{4+}$. However the lower intensity emission for the oxygen atmosphere versus an air atmosphere supports the $Cr^{3+}$ ion.

While there has been shown and described what is at present considered the preferred embodiment of the invention it will be obvious to those skilled in the art that various changes and modifications may be made therein without departing from the invention as defined by the appended claims.

What is claimed is:

1. A laser having a chromium-doped for producing optical emission in a spectral region between 1150 nm and 1650 nm comprising:

a housing containing a resonant cavity formed by mirrors at opposite ends of said housing;

a pump source means for producing optical energy;

a means for coupling said optical energy of the pump source means to said chromium doped host to produce coherent optical radiation;

a means for extracting said optical radiation from said housing;

wherein the chromium-doped host is chromium activated zinc orthosilicate.

2. A process for making chromium-activated zinc orthosilicate having optical emission in a spectral region between 1150 nm and 1650 nm including the following steps:

mixing the following reactants: $H_4SiO_4$, ZnO, $NH_4Cl$;

introducing a $NH_4F$ flux to enhance reactivity;

adding chromium to provide a chromium-doped mixture having a chromium concentration between 0.02–0.1 mole percent;

firing said chromium-doped mixture in an oxidizing atmosphere at 1250° C.

3. A process for making chromium-activated zinc orthosilicate for producing optical emission in spectral region between 1150 nm and 1650 nm including the following steps:

mixing the following reactants: $H_4SiO_4$, ZnO, $NH_4Cl$;

introducing a $NH_4F$ flux to enhance reactivity;

adding chromium to provide a chromium-doped mixture having a chromium concentration between 0.02–0.1 mole percent;

firing said chromium-doped mixture in an inert atmosphere at 1250° C.

4. A process as claimed in claim 2 including the step of:

melting the chromium-doped mixture and solidifying said mixture by a single-crystal growth process.

5. A process as claimed in claim 3 including the step of:
melting the chromium-doped mixture and solidifying said mixture by a single-crystal growth process.

6. In a laser generating optical radiation in the spectral region between 1150 nm and 1650 nm, the improvement which comprises utilizing as the laser host a chromium-activated zinc orthosilicate crystal.

7. In an optical amplifier generating optical radiation in the spectral region between 1150 nm and 1650 nm including a means to extract said optical radiation, the improvement which comprises utilizing as the optical amplifier host a chromium-activated zinc orthosilicate crystal.

* * * * *